United States Patent
Saito et al.

(10) Patent No.: US 6,919,294 B2
(45) Date of Patent: Jul. 19, 2005

(54) METHOD FOR PREPARING HYDROGENATION PURIFICATION CATALYST

(75) Inventors: Toru Saito, Toda (JP); Chikanori Nakaoka, Toda (JP)

(73) Assignee: Japan Energy Corporation, Tokyo (JP)

(*) Notice: Subject to any disclaimer, the term of this patent is extended or adjusted under 35 U.S.C. 154(b) by 91 days.

(21) Appl. No.: 10/474,712

(22) PCT Filed: Feb. 5, 2003

(86) PCT No.: PCT/JP03/01182
§ 371 (c)(1), (2), (4) Date: Oct. 10, 2003

(87) PCT Pub. No.: WO03/066215
PCT Pub. Date: Aug. 14, 2003

(65) Prior Publication Data
US 2004/0126315 A1 Jul. 1, 2004

(30) Foreign Application Priority Data
Feb. 6, 2002 (JP) ........................................ 2002-028868

(51) Int. Cl.⁷ .......................... B01J 23/00; B01J 20/00; B01J 21/04; B01J 23/02; C01F 7/02
(52) U.S. Cl. ...................... 502/305; 502/320; 502/322; 502/323; 502/327; 502/332; 502/333; 502/334; 502/335; 502/336; 502/337; 502/338; 502/339; 502/355; 502/415; 502/439; 423/625; 423/628; 423/629
(58) Field of Search ................................. 502/305, 320, 502/322, 323, 327, 332, 333, 334, 335, 336, 337, 338, 339, 355, 415, 439; 423/625, 628, 629

(56) References Cited

U.S. PATENT DOCUMENTS

| | | | | |
|---|---|---|---|---|
| 4,134,856 A | * | 1/1979 | Itoh et al. ........................ 502/66 |
| 4,181,602 A | * | 1/1980 | Quick et al. ............ 208/216 PP |
| 4,367,164 A | * | 1/1983 | Shiroto et al. ................. 502/84 |
| 4,419,275 A | * | 12/1983 | Yoshida et al. .............. 502/322 |
| 4,422,960 A | * | 12/1983 | Shiroto et al. ............... 502/206 |
| 4,655,905 A | * | 4/1987 | Plumail et al. .......... 208/216 R |
| 5,154,819 A | * | 10/1992 | Clark et al. .............. 208/216 R |
| 6,110,862 A | * | 8/2000 | Chen et al. .................. 502/326 |
| 6,174,511 B1 | * | 1/2001 | Tsukada et al. .............. 423/628 |
| 6,207,611 B1 | * | 3/2001 | Sun et al. ...................... 502/325 |
| 6,218,335 B1 | * | 4/2001 | Okada et al. ................ 502/340 |
| 6,328,880 B1 | * | 12/2001 | Yoshita et al. ........... 208/216 R |
| 6,383,974 B1 | * | 5/2002 | Ishida et al. ................. 502/305 |
| 6,413,412 B1 | * | 7/2002 | Peng et al. ..................... 208/89 |
| 6,429,172 B1 | * | 8/2002 | Tsukada et al. .............. 502/439 |
| 6,518,219 B1 | * | 2/2003 | Yang et al. ................... 502/314 |
| 6,551,500 B1 | * | 4/2003 | Ishida et al. .............. 208/111.3 |
| 6,656,349 B1 | * | 12/2003 | Fujita et al. ........... 208/216 PP |
| 6,689,712 B1 | * | 2/2004 | Tanaka ........................ 502/305 |
| 6,780,817 B1 | * | 8/2004 | Koyama et al. ............. 502/314 |
| 6,858,132 B2 | * | 2/2005 | Kumagai et al. ....... 208/216 PP |

FOREIGN PATENT DOCUMENTS

| | | |
|---|---|---|
| JP | 8-268716 A | 10/1996 |
| JP | 11-128744 A | 5/1999 |
| WO | WO 99/03783 | 1/1999 |
| WO | WO 00/33957 | 6/2000 |
| WO | WO 03/006154 | 1/2003 |

* cited by examiner

*Primary Examiner*—Cam N. Nguyen
(74) *Attorney, Agent, or Firm*—Birch, Stewart, Kolasch & Birch, LLP

(57) ABSTRACT

A method for producing a hydrorefining catalyst is used to produce the hydrorefining catalyst which contains an inorganic oxide carrier and a hydrogenation-active metal and which has such a bimodal pore characteristic that pores having pore diameters of not more than 50 nm have a pore volume of not less than 0.4 cm³/g, pores having pore diameters of not less than 50 nm have a pore volume of not less than 0.2 cm³/g, and pores having pore diameters of not less than 1000 nm have a pore volume of not more than 0.1 cm³/g. The method comprises the steps of mixing and forming a pseudo-boehmite powder having a dispersibility index of 0.13 to 0.28, and calcinating the formed pseudo-boehmite under a condition in which the pseudo-boehmite is converted into γ-alumina. The hydrorefining catalyst, which has the bimodal pore characteristic, can be produced easily at low cost.

14 Claims, No Drawings

METHOD FOR PREPARING HYDROGENATION PURIFICATION CATALYST

This application is the national phase under 35 U.S.C. § 371 of PCT International Application No. PCT/JP03/01182 which has an International filing date of Feb. 5, 2003, which designated the United States of America.

TECHNICAL FIELD

The present invention relates to a method for producing a catalyst to be used for the hydrorefining of hydrocarbon such as petroleum distillate products. In particular, the present invention relates to a catalyst to be used for the hydrodemetalization of, for example, various heavy distillate products and residues obtained by performing the atmospheric distillation or the vacuum distillation of heavy oils, i.e., crude oil, tar sand, shell oil, coal-derived liquid and the like.

BACKGROUND ART

Large amounts of metal components including, for example, nickel and vanadium are contained in the heavy oil such as the residue of the atmospheric distillation or the vacuum distillation. The metal components poison the hydrorefining catalyst which is used, for example, for the desulfurization, the denitrogenation, and the cracking, and the catalytic activity is deteriorated thereby. Therefore, a treatment is previously performed with a hydrorefining catalyst aimed for the demetallation (hereinafter referred to as "demetallation catalyst" as well).

When a catalyst, in which pores having pore diameters of not more than 50 nm occupy almost all of the pore volume, is used as the demetallation catalyst, if the demetallation activity is enhanced, then a large amount of metal is deposited or accumulated in the vicinity of pores disposed near to the outer surface of the catalyst, i.e., in the vicinity of pore inlets or openings, and the pore inlets or openings are closed thereby. Therefore, the metal deposition capacity (amount of metal capable of being deposited in the pores until the catalyst loses the activity) is decreased. On the contrary, the metal deposition capacity can be increased by using a so-called bimodal catalyst, i.e., a catalyst which has pores with pore diameters of not more than 50 nm and which also has pores with pore diameters of not less than 50 nm.

The present applicant has disclosed a method for forming and calcinating a powder of γ-alumina as a method for producing the catalyst as described above (International Patent Application PCT/JP99/06760). However, in this method, pseudo-boehmite is calcinated to produce a γ-alumina powder, the γ-alumina powder is formed, and then the calcination is performed again. Therefore, it is necessary to perform the two calcinating steps. The production steps are complicated, and the production cost is expensive. Alternatively, a bimodal catalyst can be also produced by mixing a pseudo-boehmite powder, for example, with microparticulate carbon and organic matters to perform forming, and then burning and removing the microparticulate carbon and the like during calcination. However, in the case of the production method as described above, the mechanical strength of the catalyst is insufficient in some cases.

DISCLOSURE OF THE INVENTION

The present invention has been made in order to solve the problems involved in the conventional methods as described above, an object of which is to provide a method for producing a bimodal catalyst having a sufficient mechanical strength by means of a simpler process.

As a result of investigations carried out by the present inventors to study detailed characteristics of the pseudo-boehmite, the present inventors have found out the fact that a bimodal catalyst can be produced directly by using a specified pseudo-boehmite. According to a first aspect of the present invention, there is provided a method for producing a hydrorefining catalyst containing an inorganic oxide carrier and a hydrogenation-active metal in which pores having pore diameters of not more than 50 nm have a pore volume of not less than 0.4 $cm^3/g$, pores having pore diameters of not less than 50 nm have a pore volume of not less than 0.2 $cm^3/g$, and pores having pore diameters of not less than 1000 nm have a pore volume of not more than 0.1 $cm^3/g$; the method comprising the steps of mixing and forming a pseudo-boehmite powder having a dispersibility index of 0.13 to 0.28; and calcinating the formed pseudo-boehmite under a condition in which the pseudo-boehmite is converted into γ-alumina. Alternatively, in order to produce the hydrorefining catalyst having the pore characteristic as described above, it is possible to use the pseudo-boehmite powder in which a crystallite diameter in a (020) direction is 2.0 to 3.0 nm, and a crystallite diameter in a (120) direction is 3.2 to 4.8 nm. Further, in order to produce the hydrorefining catalyst having the pore characteristic as described above, it is also possible to use the pseudo-boehmite powder in which a phase transition temperature to α-alumina is 1220 to 1240° C.

The production method of the present invention may further comprise the step of allowing the calcinated pseudo-boehmite to contain the hydrogenation-active metal. Alternatively, the pseudo-boehmite powder may be allowed to contain the hydrogenation-active metal in the step of mixing and forming the pseudo-boehmite powder.

When the specified pseudo-boehmite powder is used as the starting material as described above, the carrier for the bimodal catalyst (or the catalyst) can be produced by means of the calcination carried out once. Accordingly, the steps of producing the catalyst can be performed easily at low cost. The obtained catalyst exhibits a high mechanical strength. The hydrorefining can be performed stably by using the catalyst as described above. The pseudo-boehmite powder can be also obtained by performing, under a predetermined condition, a neutralization reaction of an acidic aluminum solution and an alkaline aluminum solution.

BEST MODE FOR CARRYING OUT THE INVENTION

Pore Volume of Catalyst

As for the pore structure of the catalyst as measured by the nitrogen adsorption method, those having pore diameters of not more than 50 nm have a pore volume of not less than 0.4 $cm^3/g$, preferably 0.6 to 1.1 $cm^3/g$, and especially preferably 0.7 to 1.0 $cm^3/g$. It is preferable that the median pore diameter in a pore distribution for pore diameters of 2 to 50 nm is 6 to 20 nm and especially 8 to 15 nm, and the specific surface area is 100 to 350 $m^2/g$. When those having pore diameters of not more than 50 nm have a pore volume of not less than 0.4 $cm^3/g$, it is possible to decrease the deterioration of the demetallation activity which would be otherwise caused by the metal deposition.

As for the pore structure of the catalyst as measured by the mercury intrusion porosimetry method, those having pore diameters of not less than 50 nm have a pore volume of not less than 0.2 $cm^3/g$, preferably 0.25 to 0.60 $cm^3/g$, and especially preferably 0.30 to 0.50 cm$^3$/g. Further, those having pore diameters of not less than 1000 nm have a pore volume of not more than 0.1 cm$^3$/g and preferably not more than 0.05 cm$^3$/g. When those having pore diameters of not less than 50 nm have a pore volume of not less than 0.2 cm$^3$/g, it is possible to improve the metal deposition capacity. When those having pore diameters of not less than 1000 nm have a pore volume of not more than 0.1 cm$^3$/g, it is possible to improve the mechanical strength of the catalyst.

Inorganic Oxide Carrier

Oxides of elements belonging to Group 2, 4, 13, and 14 of the periodic table can be used as the inorganic oxide carrier (the periodic table is based on the recommendation of IUPAC 1990). In particular, it is preferable to use, for example, silica, alumina, magnesia, zirconia, boria, and calcia. They may be used singly, or they may be used in combination of two or more of them. In particular, it is preferable to use alumina (with crystalline structure of, for example, γ, δ, η, and χ), silica-alumina, silica, alumina-magnesia, silica-magnesia, and alumina-silica-magnesia. In particular, it is preferable to use γ-alumina. It is preferable to use such a catalyst that alumina occupies, in the catalyst, an amount of not less than 50% by weight and especially not less than 70% by weight as converted into the weight of $Al_2O_3$.

Hydrogenation-active Metal Component

As for the hydrogenation-active metal component, it is possible to use elements belonging to Group 6, 8, 9, and 10 of the periodic table. In particular, it is preferable to use molybdenum and tungsten. In addition, it is also possible to use nickel and cobalt. The element as described above may be carried on the carrier as the metal, in a state of oxide, or in a state sulfide. The content of the hydrogenation-active metal component is preferably within a range of 0.1 to 25% by weight, especially within a range of 0.5 to 15% by weight, and much more preferably within a range of 1% by weight to 15% by weight as represented by the amount of the metal element with respect to the weight of the catalyst. Further, it is preferable to add a compound of phosphorus and/or boron (ordinarily in a form of oxide) into the catalyst by 0.1 to 20% by weight and especially 0.2 to 5% by weight as represented by the weight of the element. Accordingly, the demetallation activity is improved.

Pseudo-boehmite Powder Material

The present inventors have advanced investigations while directing the attention to the fact that the crystallite diameter which shows the size of primary particles (crystallites) of the pseudo-boehmite powder as the raw material and the dispersibility index which shows the degree of easy untangling during the kneading serve as important factors in order to obtain a specified pore distribution of a desired catalyst, because the final pore distribution of the catalyst is determined by pore distributions of the pseudo-boehmite powder as the raw material and the kneaded product.

As a result, it has been found out that the dispersibility index of the pseudo-boehmite powder as the raw material is required to be within a range of 0.13 to 0.28 and preferably within a range of 0.14 to 0.26 in order to obtain the pore distribution necessary for the bimodal catalyst. It has been found out for the pseudo-boehmite powder that the crystallite diameter in the (020) direction is within a range of 2.0 to 3.0 nm, preferably 2.2 to 2.6 nm, and more preferably 2.3 to 2.6 nm, and the crystallite diameter in the (120) direction is within a range of 3.2 to 4.8 nm, preferably 3.4 to 4.6 nm, more preferably 3.8 to 4.6 nm, and especially preferably 4.0 to 4.5 nm. Further, it has been found out that the phase transition temperature of the pseudo-boehmite powder to α-alumina is within a range of 1220 to 1240° C. and preferably 1222 to 1238° C.

As a result of further advanced and detailed investigations, the following fact has been confirmed. That is, it is indicated that the three characteristics, i.e., i) the dispersibility index, ii) the crystallite diameters in the (020) and (120) directions, and iii) the phase transition temperature to α-alumina are closely correlated to one another. However, the three characteristics can be adjusted independently within narrow ranges by changing the synthesis condition of the powder. Further, it is not necessarily indispensable that all of the three conditions i) to iii) are satisfied.

In order to obtain the desired pseudo-boehmite powder which satisfies all of or any one of the three conditions i) to iii) described above, for example, the synthesis condition may be appropriately selected in a neutralization reaction of an acidic aluminum solution and an alkaline aluminum solution as described in International Patent Publication WO 99/03783 (International Application No. PCT/JP98/03174) or WO 03/006156 (International Application No. PCT/JP02/06934). Alternatively, at present, a variety of pseudo-boehmite powders are available from manufacturers. In this case, a pseudo-boehmite powder, which has a certain dispersibility index, can be obtained by designating the dispersibility index as described above. Further alternatively, pseudo-boehmite powders, which have various dispersibility indexes as described above, may be obtained, and the crystallite diameters in the (020) and (120) directions and the phase transition temperature to α-alumina may be measured for each of the pseudo-boehmite powders by means of the methods as described later on to previously determine the correlation among the dispersibility index, the crystallite diameters in the (020) and (120) directions, and the phase transition temperature to α-alumina. By doing so, it is possible to specify and prepare the pseudo-boehmite powder which has the desired crystallite diameters in the (020) and (120) directions and/or the desired phase transition temperature to α-alumina as described above. As appreciated from Examples described later on, it has been revealed that specified commercially available pseudo-boehmite powders or specified pseudo-boehmite powders obtained by the neutralization reaction of the acidic aluminum solution and the alkaline aluminum solution simultaneously satisfy the three conditions i) to iii) described above.

Dispersibility Index

The dispersibility index was determined as follows. That is, 6 g of a pseudo-boehmite powder to be evaluated, 30 cm$^3$ of water, and 60 cm$^3$ of 1 N nitric acid were introduced into a vessel, followed by being ground with a blender to obtain a pseudo-boehmite slurry. The slurry was transferred to a centrifuging tube to perform centrifugal separation at 3000 rpm for 3 minutes. A suspension and a precipitate were separated from each other by means of decantation to transfer them to distinct vessels respectively. After being dried, the weight of the solid content of each of them was measured. A value, which was obtained by dividing the weight of the solid content of the suspension by the weight of the entire solid content as a sum of the weight of the solid content of the suspension and the weight of the solid content of the precipitate, was designated as the dispersibility index.

The crystallite diameter was measured as follows. That is, the apparent size of the crystallite was determined by the Scherrer method in the (020) and (120) directions of the pseudo-boehmite according to an X-ray diffraction pattern of the pseudo-boehmite powder. α-Alumina, which was obtained by calcinating a high purity pseudo-boehmite at 1600° C for 36 hours, was used for an internal standard sample. The phase transition temperature to α-alumina was measured as follows by using a differential thermal analyzer. That is, the temperature was raised at a velocity of 10° C./minute up to 1400° C. in the atmospheric atmosphere. The temperature of a peak appeared between 1200 to 1300° C. to exhibit an exothermic reaction was measured as the phase transition temperature to α-alumina.

Mixing of Powder

The raw material powder and the liquid can be mixed, for example, with a mixer or a kneader which is generally used to prepare the catalyst. A method is preferably used, in which water is added to the pseudo-boehmite powder described above, followed by being introduced into a vessel and being mixed with an agitation impeller. Usually, water is added as the liquid in this procedure. However, the liquid to be added may be an organic compound such as alcohol and ketone. It is also allowable to perform the mixing and the addition of, for example, an acid such as nitric acid, acetic acid, and formic acid, a base such as ammonia, an organic compound, a surfactant, and an active component. In particular, it is preferable that a forming auxiliary composed of an organic compound such as water-soluble cellulose ether is added by 0.2 to 5% by weight and especially 0.5 to 3% by weight with respect to the raw material powder. It is also allowable to add a hydrogenation-active metal component and an inorganic oxide other than the pseudo-boehmite powder. Even when the particulate component such as carbon and the organic compound, which is removed from the carrier by means of the treatment such as the calcination, is not substantially added (even when the particulate component is added by not more than 5% by weight with respect to the raw material powder), it is possible to produce the carrier for the bimodal catalyst.

In the present invention, the powder is mixed with the liquid to obtain a kneaded material. Macropores, which are formed at the grain boundary by the kneaded material, are fixed by means of the calcination. Accordingly, the bimodal catalyst is obtained. Therefore, the amount of water internally contained in the kneaded material is most important to determine the pore structure of the bimodal catalyst. That is, when bubbles included in the kneaded material are expelled by the kneading, and the kneaded material is adjusted to have an appropriate softness, then the amount of water internally contained in the kneaded material corresponds to the sum of the pore volume (=volume of mesopores+volume of micropores) possessed by the powder itself and the volume of macropores existing at the grain boundary. Therefore, the macropore volume is determined by the amount of water. An ordinary kneaded material having no bimodal structure exhibits a dough moisture content of 45 to 55%. However, the kneaded material having the bimodal structure of the present invention exhibits a dough moisture content of 50 to 62%. There is a difference of about 5 to 10% as a result of the comparison made when identical raw materials are used. Therefore, the kneaded material becomes extremely soft. For this reason, it is necessary to make any special contrivance in the production steps including, for example, the forming step. The degree of the kneading can be adjusted on the basis of the Pf value as described later on.

Forming

The forming of the raw material powder is not specifically limited. For example, the raw material powder can be formed in a state of paste or in a state of clay by adding, for example, water and/or an organic solvent to the raw material powder. The forming can be performed by, for example, the extrusion forming, the pressurizing forming, and the application to a processing sheet. An apparatus such as a plunger type extruder and a screw type extruder can be used to easily obtain a shape such as a pellet shape and a honeycomb shape. A formed carrier can be obtained by performing the drying and optionally the calcination after the forming. It is preferable that the drying is performed at a temperature of ordinary temperature to 150° C. and especially 80 to 140° C., and then the calcination is performed at 350 to 900° C. for not less than 0.5 hour and especially at 500 to 850° C. for 0.5 to 5 hours. The forming can be also performed to obtain a spherical shape such that the raw material powder, which is allowed to be in a gel form or in a slurry form, is dispersed in a dry gas by, for example, the spray dry, followed by being dried. Further, the forming can be also performed to obtain a spherical shape in a liquid, starting from the raw material powder which is allowed to be in a gel form or in a slurry form. Further, the following method is available as a forming method in which the raw material powder is formed as it is. That is, a forming auxiliary is added to the raw material powder, if necessary, and the pressurizing forming is performed with a tablet machine, or the forming is performed by means of the rotor granulation.

Carrying

For example, a loading method or a tempering method can be used as the method for loading or carrying the hydrogenation-active metal component on the catalyst. The stage for successfully effecting the loading includes at least one of the stage of the raw material powder and the stage after the forming and the calcination of the raw material powder. Those usable as the method for loading the hydrogenation-active metal component include known techniques including, for example, impregnating methods which are usually used, such as the pore-filling method, the heating impregnating method, the vacuum impregnating method, and the immersing method. It is preferable that the drying is performed at a temperature of 80 to 200° C. for 10 minutes to 24 hours after the impregnation of the metal component, and the calcination is performed at a temperature of 400 to 600° C. and especially 450 to 550° C. for 15 minutes to 10 hours. The following tempering methods may be available. That is, the hydrogenation-active metal component may be previously contained in the raw material. Alternatively, the hydrogenation-active metal component may be tempered by effecting the kneading together with the raw material.

Hydrorefining Condition

The hydrorefining catalyst according to the present invention is preferably used by making the contact of the heavy oil as the treatment objective with the catalyst together with hydrogen. The catalyst according to the present invention may be combined with another catalyst. Hydrogen may be introduced into the catalyst layer in the reactor. Table 1 shows preferred reaction conditions.

TABLE 1

|  | Preferred range | Especially preferred range |
| --- | --- | --- |
| Reaction temperature (° C.) | 300–450 | 320–430 |
| Partial pressure of hydrogen (MPa) | 3–25 | 8–20 |
| Liquid space velocity ($hr^{-1}$) | 0.1–10 | 0.15–2 |
| Hydrogen to oil ratio (L/L) | 100–4000 | 300–1500 |

Heavy Oil

The heavy oil, which is a preferred objective of the hydrorefining, contains main components composed of distillate products having boiling points of not less than 360° C. The distillate products preferably contains distillate products having boiling points of not less than 360 by not less than 50% and especially by not less than 70%. The heavy oil as described above may include, for example, various heavy distillate products and residues obtained by performing the atmospheric distillation or the vacuum distillation of, for example, crude oil, tar sand, shell oil, or coal-derived liquid, as well as distillate products obtained therefrom by performing a treatment such as the cracking, the isomerization, the reformation, and the solvent extraction. Those usable as the treatment objective may include heavy oils which contain metal components of vanadium and nickel by not less than 45 weight ppm and especially not less than 60 weight ppm as represented by the weight of the metal element.

EXAMPLES

The present invention will be explained below on the basis of Examples. However, the present invention should not be interpreted as being limited to Examples. At first, an explanation will be made about measuring methods used in Examples of the present invention.

Average Particle Diameter

The average particle diameter was measured on the basis of the wet system by the laser diffraction and scattering method by using Microtrac Particle Size Distribution Analyzer produced by NIKKISO Co., Ltd.

Pore Characteristics

An apparatus for measuring the specific surface area and the pore distribution, i.e., ASAP 2400 produced by Micromeritics was used to measure the pore characteristics. The specific surface area was measured in accordance with the BET method. The pore volume was obtained as a measured value at a relative pressure of 0.967 during the nitrogen gas desorption process. The pore volume corresponds to the volume of pores having diameters of not more than 50 nm. The median pore diameter was calculated as a pore diameter at which the accumulated pore volume was halved, from the relationship between the pore diameter measured by the BJH method and the pore volume obtained therefor. The pore volume of those having pore diameters of not less than 50 nm and the pore volume of those having pore diameters of not less than 1000 nm were measured by the intrusion porosimetry method on condition that the contact angle of mercury was 140°, the surface tension was 480 dyne/cm, and the pressure range was 2 to 4225 kg/cm$^2$ (30.4 to 60000 psia) by using an apparatus for measuring the pore distribution, i.e., AutoPore 9200 produced by Micromeritics.

Dispersibility Index

The dispersibility index was determined as follows. That is, ion exchange water was added to an undried sample having a dry weight of 6 g at 130° C. so that the total weight was 36 g. 60 mL of 0.1 N nitric acid was added thereto, followed by being strongly agitated so that the sample was untangled to obtain a slurry. The slurry was subjected to the centrifugal separation at 3000 rpm for 3 minutes, and the suspension and the precipitate were separated from each other. After being dried at 130° C., the solid content weight of each of them was measured. The dispersibility index was determined as the ratio of the solid content weight of the suspension by which the total weight was occupied.

Crystallite Diameter

A sample, to which α-alumina powder was added as an internal standard, was used to measure the diffraction pattern by using the CuK α-ray by the powder X-ray diffraction method to determine the half value width and the diffraction angle of the diffraction peak. The crystallite diameter was determined according to the Scherrer expression provided that the Scherrer constant was 0.9.

Phase Transition Temperature to α-Alumina

The temperature was raised at a velocity of 10° C./minute up to 1400° C. in the atmospheric atmosphere by using a differential thermal analyzer, and the temperature of the peak appeared at a temperature of 1200 to 1300° C. to exhibit the exothermic reaction-was determined as the phase transition temperature to α-alumina.

Side Surface Fracture Strength

The side surface fracture strength was measured as the load exerted upon the fracture of a columnar sample on the side surface with an indenter having a diameter of 5 mm by using an apparatus for measuring the tablet fracture strength. However, the side surface fracture strength of the catalyst pellet was measured by using an apparatus for measuring the tablet fracture strength (Tablet Hardness Tester) TH-203MP produced by TOYAMA SANGYO CO., LTD. A drying pretreatment was performed at 400° C. for 1 hour before the measurement. A pellet having a length of about 5 mm was selected, because the diameter of the measuring jig was 5 mmφ. The actually measured value was used as it was as the side surface fracture strength of the pellet without performing the correction of the length. The measurement was performed for 20 pellets per one sample. An average value thereof was used as the side surface fracture strength of the sample.

Method for Measuring Pf Value

The degree of kneading can be adjusted on the basis of the Pf value. The Pf value is prescribed as follows. That is, a kneaded material is formed into a columnar test specimen having a diameter of 33 mm and a height of 40 mm. A disk having a weight of 1192 g (diameter: 120 mm, height: 7.5 mm) is allowed to fall from a height of 186 mm as measured from the bottom surface of the test specimen to obtain a height of the deformed test specimen by which the Pf value is prescribed (Pfefferkorn Plasticity Tester, "Process for Producing Ceramics, Powder Preparation and Forming", edited by Lecture Subcommittee of Edition Committee of The Ceramic Society of Japan, The Ceramic Society of Japan, 1984). It is preferable that the material is kneaded so that the Pf value is about 15 mm to 25 mm.

Example 1

Carrier 3331, Catalyst 3162

A commercially available pseudo-boehmite powder A-1 had an average particle diameter of 74 μm, a specific surface area of 320 m$^2$/g, a pore volume of 0.78 cm$^3$/g, a median pore diameter of 7.9 nm, and a dispersibility index of 0.25.

38 g of water-soluble cellulose ether and 1661 g of ion exchange water were added to 1500 g of the powder (A-1) to perform the kneading until the Pf value was 18.6. A kneaded material having a dough moisture content of 59.0% was obtained. In this case, the amount of water contained in the dough was 1.44 g/g (=0.590/(1−0.590)) per weight of dry matter, which corresponded to 184% with respect to the pore volume 0.78 of the dry powder A-1. The kneaded material was formed into a quadrilobe columnar formed material by extruding the kneaded material through a quadrilobe opening having a maximum diameter of 1.9 mm by using an extruding forming machine. The formed material was dried for 16 hours at 130° C. by using a drying machine, followed by being calcinated for 1 hour at 800° C. under the flow of air by using a rotary kiln to obtain a carrier 3331. As for this carrier, the specific surface area was 211 m$^2$/g, the pores having pore diameters of not more than 50 nm had a pore volume of 0.86 cm$^3$/g, the pores having pore diameters of not less than 50 nm had a pore volume of 0.37 cm$^3$/g, the pores having pore diameters of not less than 1000 nm had a pore volume of 0.04 cm³/g, and the side surface fracture strength was 6.8 kgf.

The carrier was impregnated with a carrying solution prepared by using ammonium molybdate, nickel nitrate, and phosphoric acid by the spray method, followed by being dried for 20 hours at 130° C. by using a drying machine and being calcinated for 25 minutes at 450° C. under the flow of air by using a rotary kiln to prepare a catalyst 3162 containing 2.9% by weight of molybdenum, 1.0% by weight of nickel, and 0.6% by weight of phosphorus. As for the catalyst, the specific surface area was 200 m²/g, the pores having pore diameters of not more than 50 nm had a pore volume of 0.77 cm³/g, the pores having pore diameters of not less than 50 nm had a pore volume of 0.34 cm³/g, the pores having pore diameters of not less than 1000 nm had a pore volume of 0.03 cm³/g, and the side surface fracture strength was 6.3 kgf.

Example 2

Carrier 3053, Catalyst 3171

A commercially available pseudo-boehmite powder A-2 had an average particle diameter of 97 μm, a specific surface area of 319 m²/g, a pore volume of 0.78 cm³/g, a median pore diameter of 6.3 nm, and a dispersibility index of 0.19.

12 g of water-soluble cellulose ether and 569 g of ion exchange water were added to 450 g of the powder (A-2) to perform the kneading until the Pf value was 21.2. A kneaded material having a dough moisture content of 58.7% was obtained. In this case, the amount of water contained in the dough was 1.42 g/g (=0.587/(1−0.587)) per weight of dry matter, which corresponded to 182% with respect to the pore volume 0.78 of the dry powder A-2. The kneaded material was formed into a quadrilobe columnar formed material by extruding the kneaded material through a quadrilobe opening having a maximum diameter of 1.9 mm by using an extruding forming machine. The formed material was dried for 16 hours at 130° C. by using a drying machine, followed by being calcinated for 1 hour at 800° C. under the flow of air by using a rotary kiln to obtain a carrier 3053. As for this carrier, the specific surface area was 230 m²/g, the pores having pore diameters of not more than 50 nm had a pore volume of 0.86 cm³/g, the pores having pore diameters of not less than 50 nm had a pore volume of 0.50 cm³/g, the pores having pore diameters of not less than 1000 nm had a pore volume of 0.04 cm³/g, and the side surface fracture strength was 5.6 kgf.

The carrier was impregnated with a carrying solution prepared by using ammonium molybdate, nickel nitrate, and phosphoric acid by the spray method, followed by being dried for 20 hours at 130° C. by using a drying machine and being calcinated for 25 minutes at 450° C. under the flow of air by using a rotary kiln to prepare a catalyst 3171 containing 3.0% by weight of molybdenum, 1.0% by weight of nickel, and 0.6% by weight of phosphorus. As for the catalyst, the specific surface area was 224 m²/g, the pores having pore diameters of not more than 50 nm had a pore volume of 0.79 cm³/g, the pores having pore diameters of not less than 50 nm had a pore volume of 0.46 cm³/g, the pores having pore diameters of not less than 1000 nm had a pore volume of 0.04 cm³/g, and the side surface fracture strength was 5.3 kgf.

Example 3

Carrier 3066, Catalyst 3182

A commercially available pseudo-boehmite powder A-3 had an average particle diameter of 31 μm, a specific surface area of 345 m²/g, a pore volume of 0.80 cm³/g, a median pore diameter of 5.1 nm, and a dispersibility index of 0.14.

13 g of water-soluble cellulose ether and 579 g of ion exchange water were added to 450 g of the powder (A-3) to perform the kneading until the Pf value was 21.3. A kneaded material having a dough moisture content of 58.4% was obtained. In this case, the amount of water contained in the dough was 1.40 g/g (=0.584/(1−0.584)) per weight of dry matter, which corresponded to 175% with respect to the pore volume 0.80 of the dry powder A-3. The kneaded material was formed into a quadrilobe columnar formed material by extruding the kneaded material through a quadrilobe opening having a maximum diameter of 1.9 mm by using an extruding forming machine. The formed material was dried for 16 hours at 130° C. by using a drying machine, followed by being calcinated for 1 hour at 800° C. under the flow of air by using a rotary kiln to obtain a carrier 3066. As for this carrier, the specific surface area was 223 m²/g, the pores having pore diameters of not more than 50 nm had a pore volume of 0.83 cm³/g, the pores having pore diameters of not less than 50 nm had a pore volume of 0.40 cm³/g, the pores having pore diameters of not less than 1000 nm had a pore volume of 0.03 cm³/g, and the side surface fracture strength was 7.1 kgf.

The carrier was impregnated with a carrying solution prepared by using ammonium molybdate, nickel nitrate, and phosphoric acid by the spray method, followed by being dried for 20 hours at 130° C. by using a drying machine and being calcinated for 25 minutes at 450° C. under the flow of air by using a rotary kiln to prepare a catalyst 3182 containing 3.0% by weight of molybdenum, 1.0% by weight of nickel, and 0.6% by weight of phosphorus. As for the catalyst, the specific surface area was 218 m²/g, the pores having pore diameters of not more than 50 nm had a pore volume of 0.76 cm³/g, the pores having pore diameters of not less than 50 nm had a pore volume of 0.37 cm³/g, the pores having pore diameters of not less than 1000 nm had a pore volume of 0.02 cm³/g, and the side surface fracture strength was 6.4 kgf.

Example 4

Catalyst 3077

A commercially available pseudo-boehmite powder A-4 had an average particle diameter of 23 μm, a specific surface area of 344 m²/g, a pore volume of 0.77 cm³/g, a median pore diameter of 5.1 nm, and a dispersibility index of 0.19.

12 g of water-soluble cellulose ether and 539 g of aqueous ammoniacal molybdenum solution were added to 450 g of the powder (A-4) to perform the kneading until the Pf value was 21.8. A kneaded material having a dough moisture content of 55.7% was obtained. In this case, the amount of water contained in the dough was 1.26 g/g (=0.557/(1−0.557)) per weight of dry matter, which corresponded to 163% with respect to the pore volume 0.77 of the dry powder A-4. The kneaded material was formed into a quadrilobe columnar formed material by extruding the kneaded material through a quadrilobe opening having a maximum diameter of 1.9 mm by using an extruding forming machine. The formed material was dried for 16 hours at 130° C. by using a drying machine, followed by being calcinated for 1 hour at 800° C. under the flow of air by using a rotary kiln to prepare a catalyst 3077 containing 3.0% by weight of molybdenum. As for the catalyst, the specific surface area was 216 m²/g, the pores having pore diameters of not more than 50 nm had a pore volume of 0.79 cm³/g, the pores having pore diameters of not less than 50 nm had a pore volume of 0.43 cm³/g, the pores having pore diameters of not less than 1000 nm had a pore volume of 0.01 cm³/g, and the side surface fracture strength was 4.7 kgf.

The characteristics of the pseudo-boehmite powders used in Examples 1 to 4 are summarized in Table 2 in addition to results of the measurement of the interplanar spacing, the crystallite diameters of (020) and (120), and the phase transition temperature to α-alumina. The characteristics of the carriers and the catalysts manufactured in Examples 1 to 4 are summarized in Table 3.

TABLE 2

|  | Example | | | |
|---|---|---|---|---|
|  | 1 | 2 | 3 | 4 |
|  | A-1 | A-2 | A-3 | A-4 |
|  | Pseudo-boehmite powder | | | |
| Average particle diameter (μm) | 74 | 97 | 31 | 23 |
| Specific surface area (m²/g) | 320 | 319 | 345 | 344 |
| Pore volume (cm³/g) | 0.78 | 0.78 | 0.80 | 0.77 |
| Median pore diameter (nm) | 7.9 | 6.3 | 5.1 | 5.1 |
| Dispersibility index | 0.25 | 0.19 | 0.14 | 0.19 |
| (020) Crystallite diameter (nm) | 2.3 | 2.6 | 2.3 | 2.4 |
| (120) Crystallite diameter (nm) | 4.4 | 4.4 | 4.3 | 4.1 |
| Crystallite diameter ratio (120)/(020) | 1.94 | 1.68 | 1.85 | 1.70 |
| (020) Interplanar spacing (nm) | 0.648 | 0.643 | 0.653 | 0.650 |
| (120) Interplanar spacing (nm) | 0.317 | 0.317 | 0.318 | 0.318 |
| Phase transition temperature to γ-alumina (° C.) | 427 | 427 | 425 | 419 |
| Phase transition temperature to α-alumina (° C.) | 1224 | 1237 | 1231 | 1235 |

TABLE 3

|  | Example | | | |
|---|---|---|---|---|
|  | 1 | 2 | 3 | 4 |
| Carrier No. | 3331 | 3053 | 3066 |  |
| Specific surface area (m²/g) | 211 | 230 | 223 |  |
| Pore volume of pores having pore diameters of not more than 50 nm (cm³/g) | 0.86 | 0.86 | 0.83 |  |
| Pore volume of pores having pore diameters of not less than 50 nm (cm³/g) | 0.37 | 0.50 | 0.40 |  |
| Pore volume of pores having pore diameters of not less than 1000 nm (cm³/g) | 0.04 | 0.04 | 0.03 |  |
| Side surface fracture strength (kgf) | 6.8 | 5.6 | 7.1 |  |
| Catalyst No. | 3162 | 3171 | 3182 | 3077 |
| Molybdenum content (% by weight) | 2.9 | 3.0 | 3.0 | 3.0 |
| Nickel content (% by weight) | 1.0 | 1.0 | 1.0 | — |
| Phosphorus content (% by weight) | 0.6 | 0.6 | 0.6 | — |
| Specific surface area (m²/g) | 200 | 224 | 218 | 216 |
| Pore volume of pores having pore diameters of not more than 50 nm (cm³/g) | 0.77 | 0.79 | 0.76 | 0.79 |
| Pore volume of pores having pore diameters of not less than 50 nm (cm³/g) | 0.34 | 0.46 | 0.37 | 0.43 |
| Pore volume of pores having pore diameters of not less than 1000 nm (cm³/g) | 0.03 | 0.04 | 0.02 | 0.01 |
| Side surface fracture strength (kgf) | 6.3 | 5.3 | 6.4 | 4.7 |

Comparative Example 1

Carrier 3041

A commercially available pseudo-boehmite powder B had an average particle diameter of 65 μm, a specific surface area of 351 m²/g, a pore volume of 0.85 cm³/g, a median pore diameter of 7.8 nm, and a dispersibility index of 0.31.

20 g of water-soluble cellulose ether and 548 g of ion exchange water were added to 450 g of the powder (B) to perform the kneading until the Pf value was 27.9. A kneaded material having a dough moisture content of 58.6% was obtained. In this case, the amount of water contained in the dough was 1.42 g/g (=0.586/(1−0.586)) per weight of dry matter, which corresponded to 166% with respect to the pore volume 0.85 of the dry powder B. The kneaded material was formed into a quadrilobe columnar formed material by extruding the kneaded material through a quadrilobe opening having a maximum diameter of 1.9 mm by using an extruding forming machine. The formed material was dried for 16 hours at 130° C. by using a drying machine, followed by being calcinated for 1 hour at 800° C. under the flow of air by using a rotary kiln to obtain a carrier 3041. As for this carrier, the specific surface area was 214 m²/g, the pores having pore diameters of not more than 50 nm had a pore volume of 0.90 cm³/g, the pores having pore diameters of not less than 50 nm had a pore volume of 0.02 cm³/g, the pores having pore diameters of not less than 1000 nm had a pore volume of 0.00 cm³/g, and the side surface fracture strength was 14.0 kgf. When the pseudo-boehmite powder B having the dispersibility index of 0.31 was used as the raw material, it was impossible to prepare any carrier in which the pores having diameters of not less than 50 nm had a pore volume of not less than 0.05 cm³/g.

Comparative Example 2

Carrier 3033

127 L of an aqueous aluminum sulfate solution having a concentration of 1 M and 125 L of an aqueous sodium aluminate solution having a concentration of 1 M heated to 75° C. were simultaneously fed to 300 L of ion exchange water at 75° C. contained in a reaction vessel, during which the fine adjustment was made so that pH of the liquid contained in the reaction vessel was 9.0 and the temperature was constant at 75° C. The feed of the both solutions was completed in 22 minutes. After that, the aging was effected for 30 minutes while making the agitation and maintaining the temperature at 75° C. After the aging, the slurry was filtrated and washed to obtain a solid matter which was dried with a spray dryer to obtain a pseudo-boehmite powder C-1. The powder C-1 had an average particle diameter of 58 μm, a specific surface area of 326 m²/g, a pore volume of 0.86 cm³/g, a median pore diameter of 11.7 nm, and a dispersibility index of 0.41.

20 g of water-soluble cellulose ether and 544 g of ion exchange water were added to 450 g of the powder (C-1) to perform the kneading until the Pf value was 25.8. A kneaded material having a dough moisture content of 58.5% was obtained. In this case, the amount of water contained in the dough was 1.41 g/g (=0.585/(1−0.585)) per weight of dry matter, which corresponded to 164% with respect to the pore volume 0.86 of the dry powder C-1. The kneaded material was formed into a quadrilobe columnar formed material by extruding the kneaded material through a quadrilobe opening having a maximum diameter of 1.9 mm by using an extruding forming machine. The formed material was dried for 16 hours at 130° C. by using a drying machine, followed by being calcinated for 1 hour at 800° C. under the flow of air by using a rotary kiln to obtain a carrier 3033. As for this carrier, the specific surface area was 206 m²/g, the pores having pore diameters of not more than 50 nm had a pore volume of 0.96 cm³/g, the pores having pore diameters of not less than 50 nm had a pore volume of 0.04 cm³/g, the pores having pore diameters of not less than 1000 nm had a pore volume of 0.01 cm³/g, and the side surface fracture strength was 7.7 kgf. When the pseudo-boehmite powder C-1 having the dispersibility index of 0.41 was used as the raw material, it was impossible to prepare any carrier in which the pores having diameters of not less than 50 nm had a pore volume of not less than 0.05 cm³/g.

Comparative Example 3

Carrier 3035

127 L of an aqueous aluminum sulfate solution having a concentration of 1 M and 125 L of an aqueous sodium aluminate solution having a concentration of 1 M heated to 60° C. were simultaneously fed to 300 L of ion exchange water at 60° C. contained in a reaction vessel, during which the fine adjustment was made so that pH of the liquid contained in the reaction vessel was 9.0 and the temperature was constant at 60° C. The feed of the both solutions was completed in 67 minutes. After that, the aging was effected for 30 minutes while making the agitation and maintaining the temperature at 60° C. After the aging, the slurry was filtrated and washed to obtain a solid matter which was dried with a spray dryer to obtain a pseudo-boehmite powder C-2. The powder C-2 had an average particle diameter of 34 μm, a specific surface area of 291 m²/g, a pore volume of 0.72 cm³/g, a median pore diameter of 4.2 nm, and a dispersibility index of 0.12.

20 g of water-soluble cellulose ether and 598 g of ion exchange water were added to 450 g of the powder (C-2) to perform the kneading until the Pf value was 22.0. A kneaded material having a dough moisture content of 60.0% was obtained. In this case, the amount of water contained in the dough was 1.50 g/g (=0.600/(1−0.600)) per weight of dry matter, which corresponded to 208% with respect to the pore volume 0.72 of the dry powder C-2. The kneaded material was formed into a quadrilobe columnar formed material by extruding the kneaded material through a quadrilobe opening having a maximum diameter of 1.9 mm by using an extruding forming machine. The formed material was dried for 16 hours at 130° C. by using a drying machine, followed by being calcinated for 1 hour at 800° C. under the flow of air by using a rotary kiln to obtain a carrier 3035. As for this carrier, the specific surface area was 230 m²/g, the pores having pore diameters of not more than 50 nm had a pore volume of 0.85 cm³/g, the pores having pore diameters of not less than 50 nm had a pore volume of 0.65 cm³/g, the pores having pore diameters of not less than 1000 nm had a pore volume of 0.37 cm³/g, and the side surface fracture strength was 2.7 kgf. When the pseudo-boehmite powder C-2 having the dispersibility index of 0.12 was used as the raw material, the carrier, in which the pores having diameters of not less than 50 nm had a pore volume of not less than 0.05 cm³/g, was obtained. However, the pores having diameters of not less than 1000 nm are simultaneously produced in a large amount, and the prepared carrier merely had the low strength.

The characteristics of the pseudo-boehmite powders used in Comparative Examples 1 to 3 are summarized in Table 4 in addition to results of the measurement of the interplanar spacing, the crystallite diameters of (020) and (120), and the phase transition temperature to α-alumina. The characteristics of the carriers prepared in Comparative Examples 1 to 3 are summarized in Table 5. As appreciated from the results of Examples shown above, the pore volume of the catalyst is smaller than the pore volume of the carrier. Therefore, even if catalysts are produced by using the carriers produced in Comparative Examples 1 to 3, their pore volumes are smaller than the pore volumes of the respective carriers. Accordingly, it is clear that any catalyst, which is provided with the bimodal pore volume characteristic according to the present invention, cannot be obtained from each of the carriers of Comparative Examples 1 to 3.

TABLE 4

| | Comparative Example | | |
|---|---|---|---|
| | 1 | 2 | 3 |
| | B | C-1 | C-2 |
| | Pseudo-boehmite powder | | |
| Average particle diameter (μm) | 65 | 58 | 34 |
| Specific surface area (m²/g) | 351 | 326 | 291 |
| Pore volume (cm³/g) | 0.85 | 0.86 | 0.72 |
| Median pore diameter (nm) | 7.8 | 11.7 | 4.2 |
| Dispersibility index | 0.31 | 0.41 | 0.12 |
| (020) Crystallite diameter (nm) | 2.6 | 3.3 | 2.8 |
| (120) Crystallite diameter (nm) | 2.9 | 4.9 | 5.0 |
| Crystallite diameter ratio (120)/(020) | 1.14 | 1.49 | 1.76 |
| (020) Interplanar spacing (nm) | 0.638 | 0.633 | 0.643 |
| (120) Interplanar spacing (nm) | 0.318 | 0.318 | 0.318 |
| Phase transition temperature to γ-alumina (° C.) | 381 | 427 | 433 |
| Phase transition temperature to α-alumina (° C.) | 1253 | 1244 | 1266 |

TABLE 5

| | Comparative Example | | |
|---|---|---|---|
| | 1 | 2 | 3 |
| Carrier No. | 3041 | 3033 | 3035 |
| Specific surface area (m²/g) | 214 | 206 | 230 |
| Pore volume of pores having pore diameters of not more than 50 nm (cm³/g) | 0.90 | 0.96 | 0.85 |
| Pore volume of pores having pore diameters of not less than 50 nm (cm³/g) | 0.02 | 0.04 | 0.65 |
| Pore volume of pores having pore diameters of not less than 1000 nm (cm³/g) | 0.00 | 0.01 | 0.37 |
| Side surface fracture strength (kgf) | 14.0 | 7.7 | 2.7 |

Example 5

Carrier Y084S, Catalyst Y084C

An aqueous aluminum sulfate solution having an aluminum concentration of 2.6 mol/L and an aqueous sodium aluminate solution having an aluminum concentration of 2.6 mol/L were simultaneously poured into ion exchange water warmed to 57° C. to produce an alumina precipitate. When the both solutions were poured, the neutralization reaction was slowly advanced over 66 minutes while retaining the reaction temperature at 60° C. and retaining pH at 9.0. After that, the aging was effected for 30 minutes at 60° C. The aluminum concentration upon the completion of the reaction was 0.48 mol/L. A slurry obtained by this reaction was filtrated, washed, and dried with a spray dryer to obtain a pseudo-boehmite raw material powder Y084. The powder Y084 had an average particle diameter of 68 μm, a specific surface area of 343 m²/g, a pore volume of 0.83 cm³/g, a median pore diameter of 4.7 nm, and a dispersibility index of 0.13.

45 g of water-soluble cellulose ether and an appropriate amount of ion exchange water were added to 1500 g of the powder (Y084) to perform the kneading until the Pf value was 21. A kneaded material having a dough moisture content of 57.4% was obtained. In this case, the amount of water contained in the dough was 1.35 g/g (=0.574/(1−0.574)) per weight of dry matter, which corresponded to 160% with respect to the pore volume 0.83 of the dry powder Y084. The kneaded material was formed into a quadrilobe columnar formed material by extruding the kneaded material through a quadrilobe opening having a maximum diameter of 1.9 mm by using an extruding forming machine. The formed material was dried for 16 hours at 130° C. by using a drying machine, followed by being calcinated for 1 hour at 800° C. under the flow of air by using a rotary kiln to obtain a carrier Y084S.

The carrier Y084S was impregnated with a carrying solution prepared by using ammonium molybdate, nickel nitrate, and phosphoric acid by the spray method, followed by being dried for 20 hours at 130° C. by using a drying machine and being calcinated for 25 minutes at 450° C. under the flow of air by using a rotary kiln to prepare a catalyst Y084C containing 3.0% by weight of molybdenum, 1.0% by weight of nickel, and 0.6% by weight of phosphorus. As for the catalyst, the specific surface area was 221 m²/g, the pores having pore diameters of not more than 50 nm had a pore volume of 0.77 cm³/g, the pores having pore diameters of not less than 50 nm had a pore volume of 0.32 cm³/g, the pores having pore diameters of not less than 1000 nm had a pore volume of 0.09 cm³/g, and the side surface fracture strength was 6.4 kgf.

Example 6

Carrier Y083S. Catalyst Y083C

An aqueous aluminum sulfate solution having an aluminum concentration of 2.6 mol/L and an aqueous sodium aluminate solution having an aluminum concentration of 2.6 mol/L were simultaneously poured into ion exchange water warmed to 67° C. to produce an alumina precipitate. When the both solutions were poured, the neutralization reaction was slowly advanced over 69 minutes while retaining the reaction temperature at 70° C. and retaining pH at 9.0. After that, the aging was effected for 30 minutes at 70° C. The aluminum concentration upon the completion of the reaction was 0.48 mol/L. A slurry obtained by this reaction was filtrated, washed, and dried with a spray dryer to obtain a pseudo-boehmite raw material powder Y083. The powder Y083 had an average particle diameter of 58 μm, a specific surface area of 325 m²/g, a pore volume of 0.72 cm³/g, a median pore diameter of 5.2 nm, and a dispersibility index of 0.13.

45 g of water-soluble cellulose ether and an appropriate amount of ion exchange water were added to 1500 g of the powder (Y083) to perform the kneading until the Pf value was 21. A kneaded material having a dough moisture content of 57.0% was obtained. In this case, the amount of water contained in the dough was 1.33 g/g (=0.570/(1−0.570)) per weight of dry matter, which corresponded to 184% with respect to the pore volume 0.72 of the dry powder Y083. The kneaded material was formed into a quadrilobe columnar formed material by extruding the kneaded material through a quadrilobe opening having a maximum diameter of 1.9 mm by using an extruding forming machine. The formed material was dried for 16 hours at 130° C. by using a drying machine, followed by being calcinated for 1 hour at 800° C. under the flow of air by using a rotary kiln to obtain a carrier Y083S.

The carrier Y083S was impregnated with a carrying solution prepared by using ammonium molybdate, nickel nitrate, and phosphoric acid by the spray method, followed by being dried for 20 hours at 130° C. by using a drying machine and being calcinated for 25 minutes at 450° C. under the flow of air by using a rotary kiln to prepare a catalyst Y083C containing 3.0% by weight of molybdenum, 1.0% by weight of nickel, and 0.6% by weight of phosphorus. As for the catalyst, the specific surface area was 198 m²/g, the pores having pore diameters of not more than 50 nm had a pore volume of 0.66 cm³/g, the pores having pore diameters of not less than 50 nm had a pore volume of 0.34 cm³/g, the pores having pore diameters of not less than 1000 nm had a pore volume of 0.06 cm³/g, and the side surface fracture strength was 5.0 kgf.

Example 7

Carrier Y084S2, Catalyst Y084C2

45 g of water-soluble cellulose ether and an appropriate amount of ion exchange water were added to 1500 g of the powder (Y084) prepared in Example 5 to perform the kneading until the Pf value was 21. A kneaded material having a dough moisture content of 59.2% was obtained. In this case, the amount of water contained in the dough was 1.54 g/g (=0.592/(1−0.592)) per weight of dry matter, which corresponded to 175% with respect to the pore volume 0.83 of the dry powder Y084. The kneaded material was formed into a quadrilobe columnar formed material by extruding the kneaded material through a quadrilobe opening having a maximum diameter of 1.9 mm by using an extruding forming machine. The formed material was dried for 16 hours at 130° C. by using a drying machine, followed by being calcinated for 1 hour at 800° C. under the flow of air by using a rotary kiln to obtain a carrier Y084S2.

The carrier Y084S2 was impregnated with a carrying solution prepared by using ammonium molybdate, nickel nitrate, and phosphoric acid by the spray method, followed by being dried for 20 hours at 130° C. by using a drying machine and being calcinated for 25 minutes at 450° C. under the flow of air by using a rotary kiln to prepare a catalyst Y084C2 containing 3.0% by weight of molybdenum, 1.0% by weight of nickel, and 0.6% by weight of phosphorus. As for the catalyst, the specific surface area was 231 m²/g, the pores having pore diameters of not more than 50 nm had a pore volume of 0.78 cm³/g, the pores having pore diameters of not less than 50 nm had a pore volume of 0.43 cm³/g, the pores having pore diameters of not less than 1000 nm had a pore volume of 0.10 cm³/g, and the side surface fracture strength was 4.7 kgf.

Example 8

Powder 6059, Catalyst 6059C

An aqueous aluminum sulfate solution having an aluminum concentration of 2.6 mol/L and an aqueous sodium aluminate solution having an aluminum concentration of 2.6 mol/L were simultaneously poured into ion exchange water warmed to 57° C. to produce an alumina precipitate. When the both solutions were poured, the neutralization reaction was slowly advanced over 60 minutes while retaining the reaction temperature at 60° C. and retaining pH at 9.0. After that, the aging was effected for 30 minutes at 60° C. The aluminum concentration upon the completion of the reaction was 0.48 mol/L. A slurry obtained by this reaction was filtrated, washed, and dried with a spray dryer to obtain a pseudo-boehmite raw material powder 6059. The powder 6059 had an average particle diameter of 20 μm, a specific surface area of 388 m²/g, a pore volume of 0.62 cm³/g, a median pore diameter of 4.4 nm, and a dispersibility index of 0.23.

45 g of water-soluble cellulose ether and aqueous ammoniacal molybdenum solution were added to 1500 g of the powder (6059), to which an appropriate amount of ion exchange water was added to perform the kneading until the Pf value was 21. A kneaded material having a dough moisture content of 51.0% was obtained. In this case, the amount of water contained in the dough was 1.04 g/g (=0.510/(1−0.510)) per weight of dry matter, which corresponded to 168% with respect to the pore volume 0.62 of the dry powder 6059. The kneaded material was formed into a quadrilobe columnar formed material by extruding the kneaded material through a quadrilobe opening having a maximum diameter of 1.9 mm by using an extruding forming machine. The formed material was dried for 16 hours at 130° C. by using a drying machine, followed by being calcinated for 1 hour at 800° C. under the flow of air by using a rotary kiln to prepare a catalyst 6059C containing 3.0% by weight of molybdenum. As for the catalyst, the specific surface area was 224 m²/g, the pores having pore diameters of not more than 50 nm had a pore volume of 0.68 cm³/g, the pores having pore diameters of not less than 50 nm had a pore volume of 0.28 cm³/g, the pores having pore diameters of not less than 1000 nm had a pore volume of 0.02 cm³/g, and the side surface fracture strength was 5.6 kgf.

The characteristics of the pseudo-boehmite powders used in Examples 5 to 8 are summarized in Table 6 in addition to results of the measurement of the interplanar spacing, the crystallite diameters of (020) and (120), and the phase transition temperature to α-alumina. The characteristics of the carriers and the catalysts manufactured in Examples 5 to 8 are summarized in Table 7.

In the case of the catalysts of Examples 5 and 7, any one of the dispersibility index and the crystallite diameters in the (020) direction and the (120) direction is included in the range prescribed by the present invention, although the phase transition temperature to α-alumina is slightly high. Therefore, the bimodal pore characteristic intended by the present invention is achieved, and the side surface fracture strength of the catalyst is sufficient as well. In the case of the catalyst of Example 6, the dispersibility index is included in the range prescribed by the present invention, although the phase transition temperature to α-alumina is slightly high and the crystallite diameters in the (020) direction and the (120) direction are slightly large. Therefore, the bimodal pore characteristic intended by the present invention is achieved, and the side surface fracture strength of the catalyst is sufficient as well. In the case of the pseudo-boehmite powder manufactured in Example 8, any one of the dispersibility index, the phase transition temperature to α-alumina, and the crystallite diameters in the (020) direction and the (120) direction is within the range prescribed by the present invention. The bimodal pore characteristic intended by the present invention is achieved, and the side surface fracture strength of the catalyst is sufficient as well.

TABLE 6

| | Example | | | |
|---|---|---|---|---|
| | 5 | 6 | 7 | 8 |
| | Y084 | Y083 | Y084 | 6059 |
| | Pseudo-boehmite powder | | | |
| Average particle diameter (μm) | 68 | 58 | 68 | 20 |
| Specific surface area (m²/g) | 343 | 325 | 343 | 388 |
| Pore volume (cm³/g) | 0.83 | 0.72 | 0.83 | 0.62 |
| Median pore diameter (nm) | 4.7 | 5.2 | 4.7 | 4.4 |
| Dispersibility index | 0.13 | 0.13 | 0.13 | 0.23 |
| (020) Crystallite diameter (nm) | 2.8 | 3.4 | 2.8 | 2.5 |
| (120) Crystallite diameter (nm) | 4.2 | 5.1 | 4.2 | 4.0 |
| Crystallite diameter ratio (120)/(020) | 1.50 | 1.50 | 1.50 | 1.60 |
| (020) Interplanar spacing (nm) | 0.642 | 0.630 | 0.642 | 0.640 |
| (120) Interplanar spacing (nm) | 0.318 | 0.318 | 0.318 | 0.318 |
| Phase transition temperature to γ-alumina (° C.) | 412 | 405 | 412 | 427 |
| Phase transition temperature to α-alumina (° C.) | 1303 | 1298 | 1303 | 1240 |

TABLE 7

| | Example | | | |
|---|---|---|---|---|
| | 5 | 6 | 7 | 8 |
| Carrier No. | Y084S | Y083S | Y084S2 | |
| Specific surface area (m²/g) | — | — | — | |
| Pore volume of pores having pore diameters of not more than 50 nm (cm³/g) | — | — | — | |
| Pore volume of pores having pore diameters of not less than 50 nm (cm³/g) | — | — | — | |
| Pore volume of pores having pore diameters of not less than 1000 nm (cm³/g) | — | — | — | |
| Side surface fracture strength (kgf) | — | — | — | |
| Catalyst No. | Y084C | Y083C | Y084C2 | 6059C |
| Molybdenum content (% by weight) | 3.0 | 3.0 | 3.0 | 3.0 |
| Nickel content (% by weight) | 1.0 | 1.0 | 1.0 | — |
| Phosphorus content (% by weight) | 0.6 | 0.6 | 0.6 | — |
| Specific surface area (m²/g) | 221 | 198 | 231 | 216 |
| Pore volume of pores having pore diameters of not more than 50 nm (cm³/g) | 0.77 | 0.66 | 0.78 | 0.79 |
| Pore volume of pores having pore diameters of not less than 50 nm (cm³/g) | 0.32 | 0.34 | 0.43 | 0.43 |
| Pore volume of pores having pore diameters of not less than 1000 nm (cm³/g) | 0.09 | 0.06 | 0.10 | 0.01 |
| Side surface fracture strength (kgf) | 6.4 | 5.0 | 4.7 | 4.7 |

INDUSTRIAL APPLICABILITY

According to the method for producing the hydrorefining catalyst of the present invention, the carrier and the catalyst, each of which has the bimodal pore characteristic, can be produced by the calcination carried out once. Therefore, it is possible to simplify the production steps of the catalyst, and it is possible to realize the low cost. The catalyst, which is obtained by the production method of the present invention, exhibits the high mechanical strength. Therefore, it is possible to perform the hydrorefining stably at low running cost.

What is claimed is:

1. A method for producing a hydrorefining catalyst containing an inorganic oxide carrier and a hydrogenation-active metal, the catalyst comprising pores having pore diameters of not more than 50 nm have a pore volume of not less than 0.4 cm$^3$/g, pores having pore diameters of not less than 50 nm have a pore volume of not less than 0.2 cm$^3$/g, and pores having pore diameters of not less than 1000 nm have a pore volume of not more than 0.1 cm$^3$/g, the method comprising the steps of:

mixing and forming a pseudo-boehmite powder having a dispersibility index of 0.13 to 0.28; and calcinating the formed pseudo-boehmite powder under a condition in which the pseudo-boehmite powder is converted into γ-alumina.

2. The method for producing the hydrorefining catalyst according to claim 1, further comprising the step of allowing the calcinated pseudo-boehmite powder to contain the hydrogenation-active metal.

3. The method for producing the hydrorefining catalyst according to claim 1, wherein the pseudo-boehmite powder is allowed to contain the hydrogenation-active metal in the step of mixing and forming the pseudo-boehmite powder.

4. The method for producing the hydrorefining catalyst according to claim 1, wherein a crystallite diameter in a (020) direction of the pseudo-boehmite powder is 2.0 to 3.0 nm, and a crystallite diameter in a (120) direction is 3.2 to 4.8 nm.

5. The method for producing the hydrorefining catalyst according to claim 4, wherein the pseudo-boehmite powder is produced by performing, under a predetermined condition, a neutralization reaction of an acidic aluminum solution and an alkaline aluminum solution.

6. The method for producing the hydrorefining catalyst according to claim 1, wherein a phase transition temperature of the pseudo-boehmite powder to α-alumina is 1220 to 1240° C.

7. The method for producing the hydrorefining catalyst according to claim 6, wherein the pseudo-boehmite powder is produced by performing, under a predetermined condition, a neutralization reaction of an acidic aluminum solution and an alkaline aluminum solution.

8. A method for producing a hydrorefining catalyst containing an inorganic oxide carrier and a hydrogenation-active metal in which pores having pore diameters of not more than 50 nm have a pore volume of not less than 0.4 cm$^3$/g, pores having pore diameters of not less than 50 nm have a pore volume of not less than 0.2 cm$^3$/g, and pores having pore diameters of not less than 1000 nm have a pore volume of not more than 0.1 cm$^3$/g, the method comprising the steps of:

mixing and forming a pseudo-boehmite powder in which a crystallite diameter in a (020) direction is 2.0 to 3.0 nm, and a crystallite diameter in a (120) direction is 3.2 to 4.8 nm; and calcinating the formed pseudo-boehmite powder under a condition in which the pseudo-boehmite powder is converted into γ-alumina.

9. The method for producing the hydrorefining catalyst according to claim 8, further comprising the step of allowing the calcinated pseudo-boehmite powder to contain the hydrogenation-active metal.

10. The method for producing the hydrorefining catalyst according to claim 8, wherein the pseudo-boehmite powder is allowed to contain the hydrogenation-active metal in the step of mixing and forming the pseudo-boehmite powder.

11. The method for producing the hydrorefining catalyst according to claim 8, wherein a phase transition temperature of the pseudo-boehmite powder to α-alumina is 1220 to 1240° C.

12. A method for producing a hydrorefining catalyst containing an inorganic oxide carrier and a hydrogenation-active metal, the catalyst comprising pores having pore diameters of not more than 50 nm have a pore volume of not less than 0.4 cm$^3$/g, pores having pore diameters of not less than 50 nm have a pore volume of not less than 0.2 cm$^3$/g, and pores having pore diameters of not less than 1000 nm have a pore volume of not more than 0.1 cm$^3$/g, the method comprising the steps of:

mixing and forming a pseudo-boehmite powder which has a phase transition temperature to α-alumina of 1220 to 1240° C.; and calcinating the formed pseudo-boehmite powder under a condition in which the pseudo-boehmite powder is converted into γ-alumina.

13. The method for producing the hydrorefining catalyst according to claim 12, further comprising the step of allowing the calcinated pseudo-boehmite powder to contain the hydrogenation-active metal.

14. The method for producing the hydrorefining catalyst according to claim 12, wherein the pseudo-boehmite powder is allowed to contain the hydrogenation-active metal in the step of mixing and forming the pseudo-boehmite powder.

* * * * *